United States Patent

[11] 3,597,860

| [72] | Inventor | Achille Capecelatro |
| | | 153 Woodland Road, Madison, N.J. 07940 |
| [21] | Appl. No. | 864,085 |
| [22] | Filed | Oct. 6, 1969 |
| [45] | Patented | Aug. 10, 1971 |

[54] TEACHING AID
6 Claims, 11 Drawing Figs.

[52] U.S. Cl.................................................. 35/19 R,
 35/30, 273/145 R
[51] Int. Cl................................................... G09b 23/06
[50] Field of Search.................................... 35/24 R,
 30, 19 R, 18 R, 18 A, 31 D, 31 F; 273/146, 144 R,
 144 A, 144 B, 145 R, 145 C, 145 CA

[56] References Cited
UNITED STATES PATENTS
3,095,655 7/1963 Berglund........................ 35/30

3,148,886 9/1964 Sharp............................ 273/145 R
FOREIGN PATENTS
552,168 1/1958 Canada........................ 273/144 B

*Primary Examiner*—Harland S. Skogquist
*Attorney*—Burgess, Dinklage & Sprung

ABSTRACT: A teaching aid for teaching decay-growth phenomenon. Polyhedrons representing a parent isotope and having at least one distinctively marked face are thrown, and those having a distinctively marked face up are replaced by other pieces which may be marked to serve as a daughter isotope or may be unmarked to serve as the stable atoms. Data is taken after each throw and replacement, and plotted, whereby decay-growth curves are obtained. A throwing tray with a nested storage tray are provided for containing the polyhedrons.

INVENTOR
ACHILLE CAPECELATRO

Patented Aug. 10, 1971     3,597,860

INVENTOR
ACHILLE CAPECELATRO
BY
Burgess, Dinklage & Sprung
ATTORNEY.

Patented Aug. 10, 1971

INVENTOR
ACHILLE CAPECELATRO
BY
Burgess, Dinklage & Spring
ATTORNEY.

TEACHING AID

This invention is a teaching aid, more particularly a teaching aid suitable for teaching phenomenon such as radioactivity.

Professors Hume and Ivey of the University of Toronto in about 1960, demonstrated that a decay curve could be roughly simulated with a large number, about 60, ordinary six-sided dice. After each throw, all fives are removed, and the number of dice remaining after each throw is plotted against the number of the throw. The objective is a plot indicating decay and growth curves as are shown in FIG. 1. That experiment however, is impractical for teaching or laboratory use. The probability of a single die is 1 to 6, too high for obtaining results of satisfactory accuracy. Further, the experiment demonstrates only phenomenon for a system having two isotopes, a radioactive isotope and a stable isotope; systems of three isotopes (parent, daughter, stable), as is indicated in FIG. 2, or of four isotopes (parent, first daughter, second daughter, stable atom), as is indicated in FIG. 3, etc., could not, to any practical degree, be represented. Nevertheless the mentioned work indicates the possibility of utilizing dice throws to simulate decay curves.

Pursuing the work of Hume and Ivey, with the idea of finding a practical aid, it was recognized that the technique could be practiced, eliminating some of the disadvantages of the early work, by using polyhedrons having more faces than the common, six-sided die, and marking one or more faces of each polyhedron. At present, as a practical matter, regular polyhedrons are used, though polyhedrons of any shape could be used.

The regular polyhedron with the greatest number of sides or faces is the icosahedron, which has 20 faces. The only other possible regular polyhedrons are those having 12, eight, six or four faces.

Further, it was recognized that by utilizing more than one kind of polyhedron, curves could be conveniently obtained for radioactive series such as a parent-daughter-stable atom. Thus it appeared that the possible variables included two or more of the group 20-, 12-, 8-, 6-, and 4-faced regular polyhedrons. Additionally, spheres can be used to represent the stable atoms. (Hereinafter, spheres are at times called ∞-sided polyhedrons).

There are other variables. Among these is the number of faces of the polyhedron having the greatest number of faces, in a particular embodiment. The larger the number of faces, the lower the probability factor can be, e.g. if 20-faced polyhedrons are used (with only one face of each polyhedron marked), the corresponding smallest probability factor is one in 20. Other possibilities exist for the 20-faced polyhedrons. For example, three sides could be marked to indicate a decay having a three in 20 decay factor. If the polyhedrons having the largest number of faces are eight-sided, the corresponding smallest probability factor is one in eight. A low probability factor is desirable from the standpoint of accurateness of the results of the experiment, but the lower the probability factor the more complicated, involved and prolonged, is the experiment. Though the polyhedrons having the largest number of sides or faces are commonly 20-sided, they can have fewer sides, e.g. 12, 8, 6, or 4.

Another variable is the number of polyhedrons used for a single isotope. A large number is desirable, but the larger the number, the more cumbersome the experiment. In general, the number of various size polyhedrons is principally influenced by the total number and the number of marked faces of the polyhedron representing the parent. Also, the number of polyhedrons representing a daughter can be less than the total number representing the parent.

It is of course possible that in a set, for example, in which parent and first daughter are represented by, respectively, 20-sided and 12-sided polyhedrons, the number of 12-sided polyhedrons required would be equal to the number of 20-sided polyhedrons, as all marked faces of the 20-sided polyhedrons could be faceup after the first throw. The probability of this, however, is such that the number of 12-sided polyhedrons required is less than the number of 20-sided polyhedrons.

Spheres are used to represent the stable isotope. It may seem that the number of spheres should equal the number of parent polyhedrons, since eventually all the atoms will disintegrate to the stable isotope. Usually, however, the number of spheres can be less, since the game need not be played so long that complete disintegration has occurred. In some embodiments it is desirable that the number of spheres equal the number of polyhedrons representing the parent isotope.

The number of each type of polyhedron less than the number theoretically required should be selected so that, taking into account all the variables, with reasonable certainty, a sufficient number will be available. Careful attention to the number of pieces required can result in a savings in cost.

Another variable is the combination of polyhedrons employed, e.g. 20-, eight-, and ∞-faced polyhedrons, or 20-, 12-, and ∞-, etc. Pertinent to this choice is whether and to what degree it is desired to simulate accurately an actual radioactive series.

As indicated above, another variable is the number of faces of the polyhedrons that are marked to indicate a change due to radioactivity. In the aforementioned work of Hume and Ivey, the marked faces are the faces marked five; in using polyhedrons in practice of the invention, dots can be used to mark the faces. The probabilities can be varied by marking one, two, or more sides of each type of polyhedron. All polyhedrons representing a given isotope should be marked on the same number of faces except where it is desired to allow for "branching." Usually, fidelity is greatest when but one side on the 20-faced polyhedron is marked, but the various possibilities for decay curves can be significantly simulated by suitable selection of the number of marked faces of the polyhedrons representing the parent, daughter or daughters, and stable isotope.

Other variables can be obtained by way of the directions under which the game is played. The play involves removing, after each throw, polyhedrons having a marked face up and possible replacing the removed pieces with polyhedrons of different structure, depending on the radioactivity to be represented, of which more hereinafter. Thus, it can be provided that 100, 20-faced polyhedrons each having one marked face, are used, and that only one out of every five having a marked face, up, are to be removed after each throw, so that the probabilities are modified to those of an embodiment employing 100-faced regular polyhedrons (which are not available). Another possibility is the combining in a single plot, the data obtained by a series of trials. For example, eight trials would be the equivalent of having 800 polyhedrons in one trial.

Another variable is color. Thus, the polyhedrons representing different isotopes could have the same number of faces but differ in color and the number of marked faces.

With respect to the objective of providing a practical teaching aid, a problem is to choose from and integrate the possibilities as are mentioned above to obtain a teaching aid which is practical in that the exercise can be completed in its entirety within the attention span of the student, while at the same time, reasonable fidelity to natural radioactive phenomenon is assimilated.

Experimenting has shown that the combinations indicated in the following table are well suited for the purposes of the invention. The figures in the body of the table are for the number of pieces of the isotopes indicated.

| Parent | 1st Daughter | 2nd Daughter | Stable Atom |
|---|---|---|---|
| 100—220 | 30—120 | 30—120 | 50—220 |
| 180—220 | 30—50 | 40—60 | 100—160 |
| 100—200 | 60—100 | — | 50—200 |
| 140—180 | 70—100 | — | 140—180 |
| 160 | 80 | — | 160 |

| Parent | 1st Daughter | 2nd Daughter | Stable Atom |
|---|---|---|---|
| 50—200 | — | — | 30—200 |
| 100 | — | — | 100 |

The number of first daughters, second daughters and stable atoms need not be more than the number of parents, and each is preferably less. Where there are four isotopes the number of pieces for the second daughter can be more than the number for the first daughter with the probabilities provided so that the second daughter grows faster than the first daughter. Desirably, the parents are represented by 20-sided regular polyhedrons and the stable atoms are represented by spheres, with the daughters being represented by 12-, 8-, 6-, or 4-sided regular polyhedrons. Of the 12-, 8-, 6-, and 4-sided polyhedrons, the 12- and 8-sided are preferred since they are more susceptible to being tumbled. The pieces of each set (the 20-sided polyhedrons, for example, being a "set") can be and preferably are the same color, with the color for each isotope being different.

The markings on the various pieces are such that, for example, using an embodiment having four isotopes, decay-growth phenomena are illustrated by throwing all the parent pieces alone, replacing parent pieces by a predetermined rule involving the position of the distinctively marked faces with first daughters, continuing to throw the pieces thereby accumulated after each throw, so replacing parent pieces with first daughters, and similarly first daughters with second daughters, and second daughters with stable atoms. The number of pieces of each type after each throw and the corresponding replacement is plotted against the number of the throw. In this way, for the four isotope embodiments, and by smoothing, a plot as is shown in FIG. 3 can be obtained. Similarly for two and three isotope embodiments, respectively, curves as are shown in FIG. 1 and FIG. 2 can be obtained.

In the accompanying drawings:

FIGS. 1, 2, and 3 are plots of decay-growth curves and are discussed above;

Figure 4:
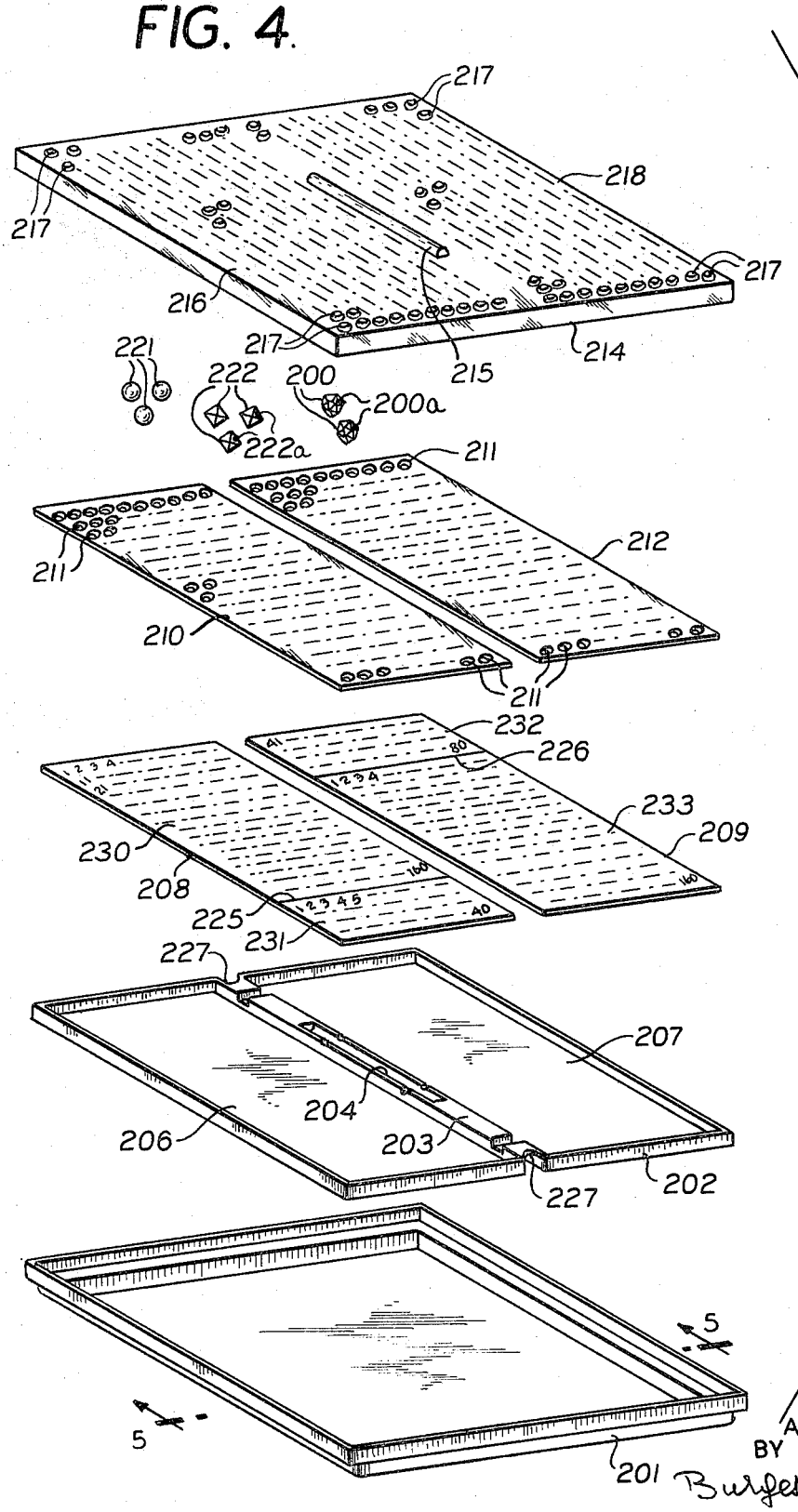
FIG. 4 is an expanded showing of a teaching aid according to the invention.

In the drawings, numbers below 200 indicate printed figures of the teaching aid, and numbers 200 and above indicate structural elements of the teaching aid. For example in FIG. 4, 208 and 209 are sheets, e.g. paper sheets, having printed thereon the numbers shown which are below 200. Like reference characters for structural parts in different views represent corresponding parts.

In the embodiment illustrated in the drawings, there are (FIG. 4) parent pieces 200 which are 20-sided, yellow, regular polyhedrons having a red dot 200a on one and only one side thereof, daughters 222, which are eight-sided, blue regular polyhedrons having a red dot 222a on one and only one side thereof, and stable atoms 221, which are opaque (cloud-colored) spheres.

Figure 1:
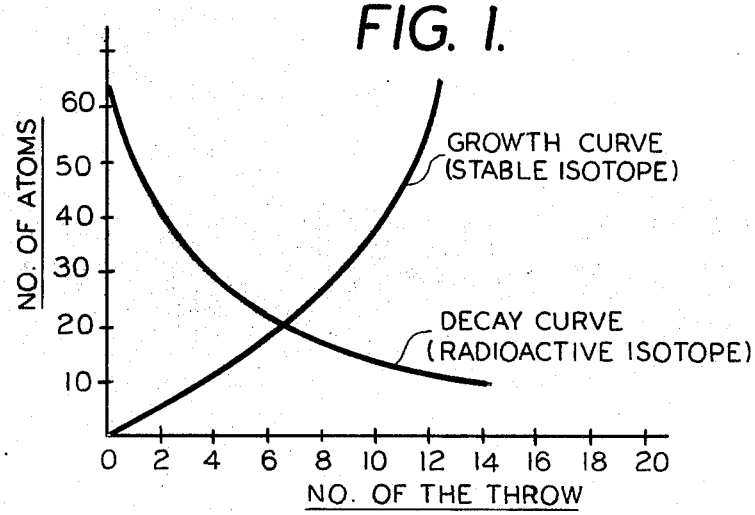
Figure 2:
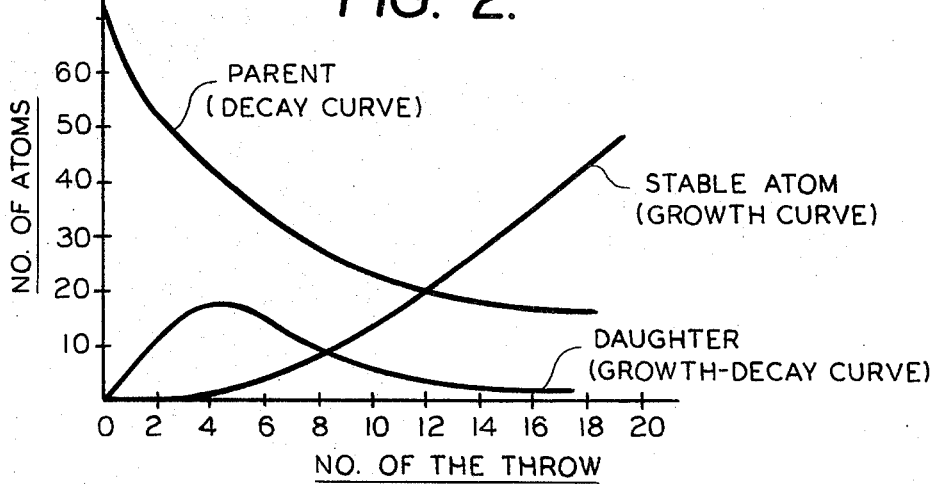
Figure 3:
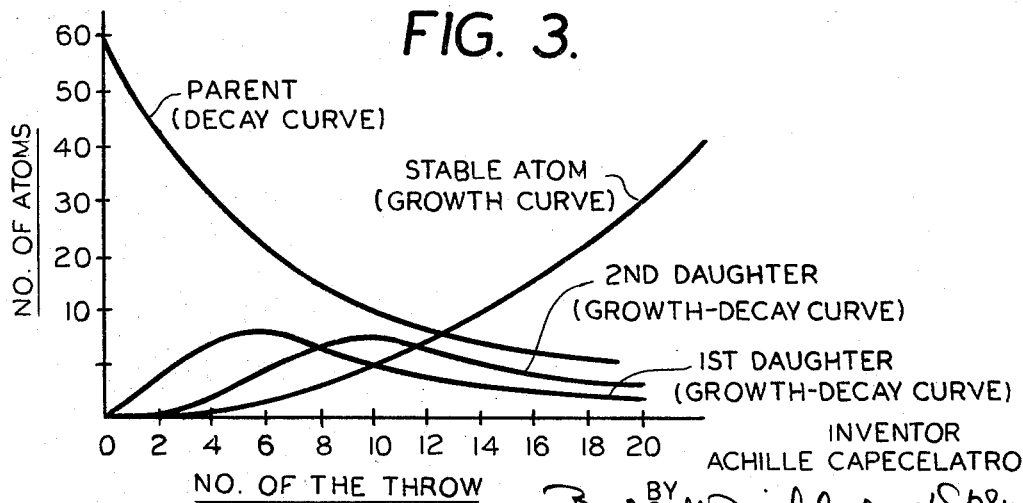
Figure 6:
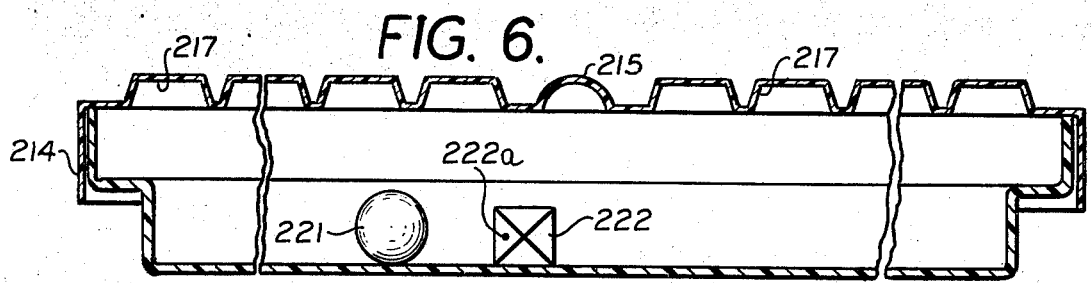
FIG. 6 is a cross section as is shown in FIG. 5, with the storage tray removed.
Figure 7:
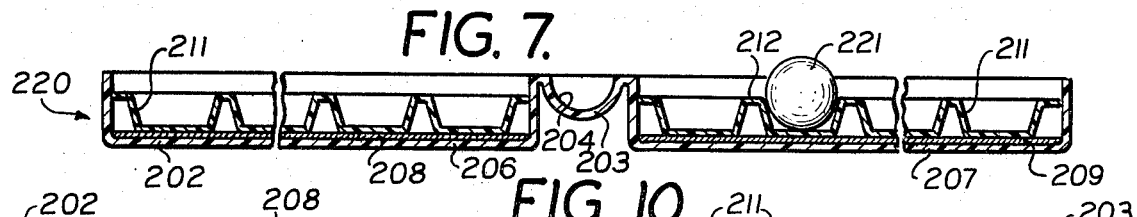
FIG. 7 is a cross section of the storage tray alone, corresponding with the cross section shown in FIG. 5.
Figure 10:
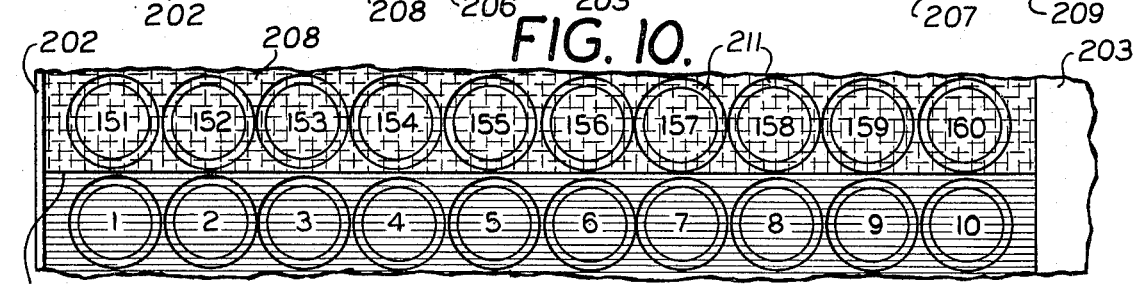
FIG. 10 and FIG. 11 are enlargements, respectively, of the portions of the throwing tray adjacent lines 225 and 226 of the storage tray.
Figure 11:
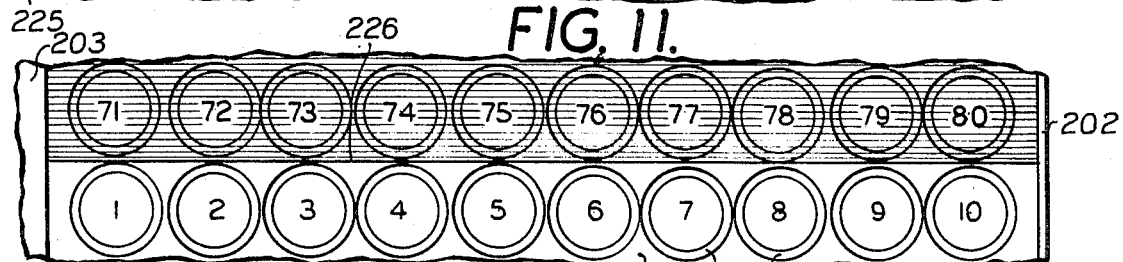
Figures 8, 9:
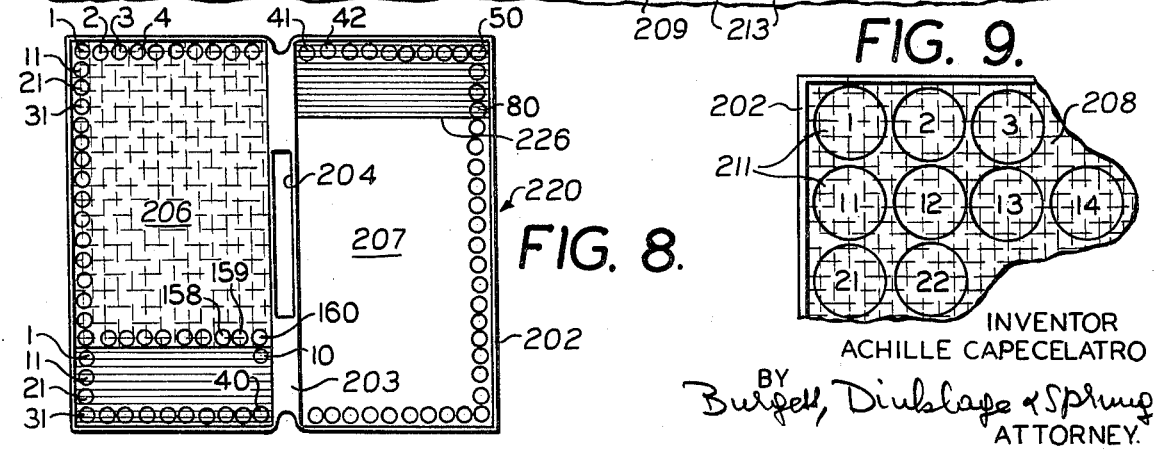
FIG. 8 is a schematic, plan view of the storage tray.
FIG. 9 is an enlargement of the upper left-hand corner of the storage tray as shown in FIG. 8.

The teaching aid comprises throwing or shaking tray 201 having bottoms and sides for containing the pieces as is shown in FIG. 6, wherein cover 214 is shown in place on the tray. The tray with cover in place is shaken, turned over, etc. to tumble the pieces; the tray is then placed upright and shaken slightly so that all pieces rest on the bottom of the tray; the cover is removed and pieces are interchanged between the throwing tray and the storage tray 202 (FIG. 7), according to predetermined rules as is explained above and specifically illustrated below. Data is then obtained and points are plotted for a graph as is shown in FIG. 2. The cover is then placed on the tray and the pieces are again shaken for the next throw. These steps are repeated with the objective of obtaining curves as are indicated in FIG. 2. Actually, the plotted points will only approximate the curves as shown in FIG. 2, the degree to which the points approach the curves being dependent on the values employed for the variables discussed above such as the number of the various pieces.

Thus, in use, the throwing tray 201 and cover 214 are used together while the storage tray 202 is used to hold pieces not contained in the throwing tray.

Figure 5:
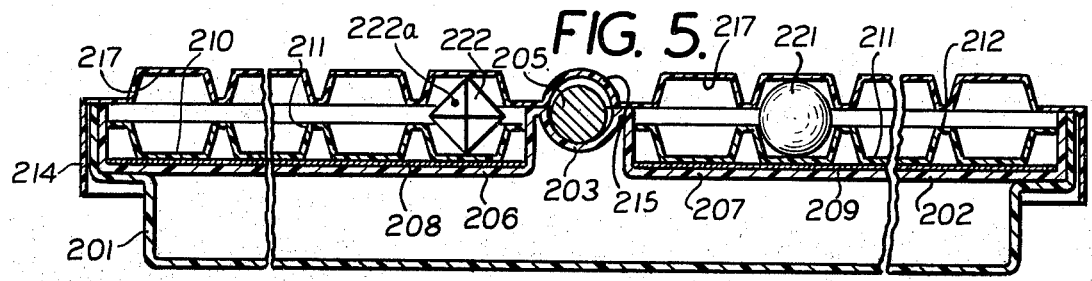
FIG. 5 is a cross section taken along line 5—5 in FIG. 4, of the assembled teaching aid.

When not in use, the storage tray 202 is nested in the throwing tray 201 with the pieces contained in the storage tray and the cover in place as is shown in FIG. 5.

Turning to details of the construction, the storage tray 202 has left-haNd and right-hand recessed portions or bottoms 206 and 207 separated by divider 203 having cutouts 227 for facilitating inserting and removing the storage tray in the throwing tray 201 with the fingers, and recess 204 for a marking instrument 205 (FIG. 5).

Sheets 208 and 209, which can be paper are placed respectively, in the left-hand and right-hand recesses 206 and 207 of storage tray 202. The sheets serve to divide the storage tray into storage areas for the parent, daughter and stable atoms. Thus, the yellow colored area 230 is for parent isotopes, the blue portions 231 and 232 together provide an area for the daUghter isotopes and the white-colored area 233 is for the stable isotopes.

Overlaying the sheets 208 and 209 are, respectively, transparent plastic sheets 210 and 212, each of which has a plurality of upwardly opening recesses 211.

The upwardly opening recesses are arranged in aligned ranks and files, and are numbered consecutively commencing with 1, by numbers printed on the sheets 208 and 209. The numbers for the parent isotopes are 1—160, for the daughters 1—80, and for the stable isotopes 1—160.

The removable throwing tray cover 214 includes a left-hand side 216 and a right-hand side 218, which overlay, respectively, the transparent plastic sheets 210 and 212, when the teaching aid is in the assembled conditions shown in FIG. 5. Downwardly opening recesses 217 are formed in the cover and overlay the upwardly opening recesses 211 in the plastic sheets 210 and 212, so that, referring to FIG. 5, with lower portions of pieces 221 and 222 received in the recesses 211 in the lower sheets, the upper portions of these pieces are received in the upper recesses 217, and thereby, the recesses cooperate to secure the pieces in fixed locations in the storage trays.

The portions of the cover 214 joining the sides 216 and 218 has a downwardly opening recess 215 complementing the upwardly opening recess 204 in the storage tray 202, for securing the marker 205 in place.

The cover 214 is transparent plastic so that the pieces in place in the storage tray 202 can be seen with the aid assembled. The aid then has an attractive appearance.

An advantage of the described construction is that during play, with the storage tray 202 removed and the cover 214 in place on the throwing tray as is shown in FIG. 6, a rough surface, namely, the inside surface of the cover 214, is provided. Then when the tray is tipped and shaken, the pieces are worked against a rough surface, with the result that good tumbling action is obtained. This is significant because polyhedrons tend to slide over a smooth surface such as the smooth bottom of the throwing tray 201 without the occurrence of the desired tumbling. The six-sided and four-sided regular polyhedrons are particularly susceptible to sliding; because of this the 20-, 12-, and eight-sided regular polyhedrons are preferred. As an alternative, the inside surface of cover 214 can be of any desired contour so as to provide merely a rough surface for good tumbling action.

The parent, daughter and stable isotope pieces are preferably different colors, e.g. yellow, blue, and opaque, respectively, and the portions or areas of sheets 208 and 209 underlying the respective groups of pieces match the overlaying pieces.

If desired, as marketed, for reasons of economy, the pieces can be unmarked, and instruction provided for applying the marks, such as dots 200a and 222a (FIG. 4). Further, the marking can be with a removable, e.g. water-soluble, marking composition, so that the marking can be changed to change the probabilities.

Also the numbered sheets 208 and 209 can be removable, and alternate sheets provided, and possible additional pieces, so that different decay-growth systems can be represented with the teaching aid.

In the use of the teaching aid illustrated in the drawings, the storage tray 202 is filled with yellow 20-sided, regular polyhedrons 200 (parent isotope) having one side thereof marked with a red dot 200a, filling the recesses 211 provided therefor, and blue, eight-sided, regular polyhedrons 222 (daughter isotope) having one side thereof marked with a red dot 222a, filling the recesses 211 provided therefor, and unmarked opaque spheres 221 (stable isotope) filling the recesses 211 provided therefor. The storage tray, initially nested in the throwing tray 201, is removed, and placed alongside for use during the play.

The parent pieces 200 are removed from the storage tray 202 and placed in the throwing tray 201, the cover 214 is placed over the throwing tray and a "throw" is made by shaking and tumbling the throwing tray, turning it upright, and shaking so that all of the parent pieces rest on the bottom of the throwing tray. The cover is then removed and pieces are replaced according to a predetermined rule, involving the position of the red dots 200a. More particularly, each polyhedron having a red dot on its upwardly disposed side (a characteristic of some regular polyhedrons is that when resting on a side in a horizontal surface, the uppermost portion thereof is a single side parallel to the first-mentioned side; some irregular polyhedrons have the same characteristic) is removed from the throwing tray and replaced by a daughter piece 222 taken from the storage tray. The "throw" is then complete and data is taken for construction of decay-growth curves as we are shown in FIG. 2. In particular, for the first throw the number of parent pieces 200 and daughter pieces 222 in the throwing tray 101, after the described replacement, is recorded. This provides a point on the decay curve for the parent pieces and a point on the growth curve for the decay pieces. The play is continued by making successive throws, and after each throw replacing parent pieces 200 with daughter pieces 222, and similarly daughter pieces with stable pieces 221, and plotting the number of pieces of each type after each throw and the corresponding replacement, against the number of the throw.

The play is facilitated by observing the following practice in the use of the storage tray: when transferring pieces from the throwing tray to the storage tray, place the transferred pieces in the recesses provided therefor having the highest numbers (e.g. the first-transferred parent piece is placed in the parent piece recess numbered 160, the second in the recess numbered 159, etc.); and when transferring pieces from the storage tray to the throwing tray, take the pieces from the recesses having the lowest numbers (e.g. the first-transferred daughter piece is taken from the daughter piece recess numbered 1, etc.). Then, the data to be taken after each throw and the corresponding replacement, can be readily obtained by merely noting the number of unoccupied recesses for each of the parent, daughter and stable pieces.

In a modified construction, the recesses of the cover can be numbered, and the cover, when inverted, can be used as the storage tray during play. Throwing could then be effected by, for example, placing the pieces to be thrown in a small container, shaking and throwing them into the throwing tray.

What I claim is:

1. A teaching aid for studying decay-growth phenomenon by experiments involving throwing polyhedron pieces having distinctively marked faces and representing the parent state, and selectively removing from the thrown parent polyhedrons, according to a predetermined rule involving the position of the said distinctively marked faces, part of the thrown polyhedrons, and replacing the removed polyhedrons by other pieces representing a decay state and visually distinguishable from the first-mentioned polyhedrons, comprising:

a. a throwing tray having a bottom and sides for the throwing of the pieces,
   b. a storage tray having a storage area for the parent polyhedrons and a storage area for the decay pieces each of said storage areas having consecutively numbered upwardly opening recesses, said numbering beginning with one and each recess being for receiving a bottom portion of one piece, the number of said recesses for the parent and decay pieces, respectively, equaling the number of parent and decay pieces, said storage tray being nested in the throwing tray and manually removable therefrom,
   c. parent and decay pieces for being seated in the storage tray recesses, 2. A teaching aid according to claim 1, some of the pieces having removable distinctive markings, whereby distinctive markings can be changed to change a probability factor.

3. A teaching aid according to claim 1, and a marker for marking pieces to impart said distinctive marking thereto, and means for storing the marker in association with the throwing tray and storage tray.

4. A teaching aid according to claim 1, the parent polyhedron pieces and the decay pieces being different colors and the respective storage areas being colored the same as pieces therefor.

5. A teaching aid according to claim 1, said consecutive numbering being replaceable, permitting modifying the number of pieces used in the studying.

6. A teaching aid according to claim 1, said cover for the throwing tray having downwardly opening recesses, each of the cover recesses being for receiving an upper portion of a piece, whereby the upwardly opening and downwardly opening recesses can cooperate to secure the pieces in fixed locations in the storage tray, said recesses of the cover imparting thereto said rough inner surface.